(No Model.)
L. C. POLLARD.
TOP PROP FOR BUGGIES.
No. 527,183. Patented Oct. 9, 1894.
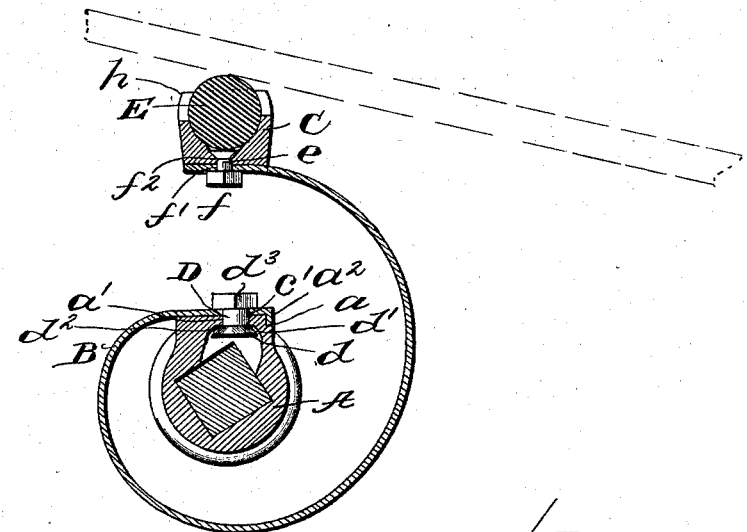
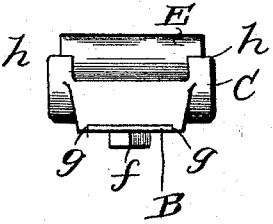
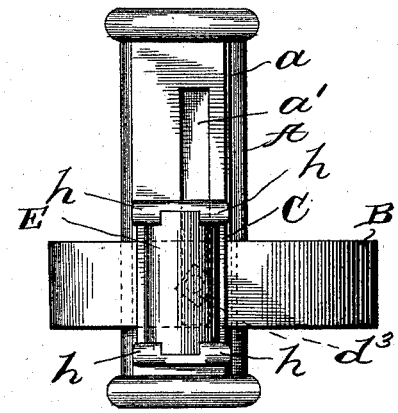
Witnesses
G. A. Faubenschmidt.
J. D. Kingsbury.
Inventor
Lewis C. Pollard
By Wm. H. Bates
Attorney

UNITED STATES PATENT OFFICE.

LEWIS C. POLLARD, OF WATERVILLE, MAINE.

TOP-PROP FOR BUGGIES.

SPECIFICATION forming part of Letters Patent No. 527,183, dated October 9, 1894.

Application filed July 14, 1894. Serial No. 517,555. (No model.)

*To all whom it may concern:*

Be it known that I, LEWIS C. POLLARD, a citizen of the United States, residing at Waterville, in the county of Kennebec and State of Maine, have invented certain new and useful Improvements in Top Props for Buggies and Similar Vehicles; and I do hereby declare the following to be a full, clear, and exact description of the invention, such as will enable others skilled in the art to which it appertains to make and use the same.

My invention relates to improvements in top props for buggies and similar vehicles. It has for its object to receive the shock produced by the weight or blow of the buggy top upon a cushion when it is thrown back or let down as occasion requires thus preventing breaking of the braces supporting the top.

To this end the invention consists in the novel construction and combination of parts as will be hereinafter more particularly described and specifically pointed out in the appended claims.

I have fully and clearly illustrated my invention in the accompanying drawings, in which—

Figure 1 is a side elevation of my improved top prop, and Fig. 2 is a top or plan view of the same. Fig. 3 is an end view of the receptacle or seat for cushion.

Similar letters of reference indicate corresponding parts in the several figures.

A, designates a hollow cylinder which is secured to a spindle said spindle being in turn secured to the side rail of a buggy. The upper face of this cylinder is flattened and has formed thereon upon its edge a longitudinal recess or groove $a$, and also upon this flattened surface portion of the cylinder is formed a longitudinal slot $a'$, the former designed for engagement with a depending flange $a^2$, struck downwardly upon the attached end of a spring, and the latter for the reception of a nut $d^3$ and bolt D carried in said slot by means of the attached end of said spring which will be presently explained.

B, designates a curvilinear spring having a depending flange $a^2$, upon its larger or attached end which slides freely in a groove or recess $a$, of the cylinder A. This spring B, has a hole $c'$, formed in its larger or attached end through which and the slot $a'$, in the cylinder A, the bolt D, is passed, said bolt having a head $d$ upon its lower end which engages with or slides in grooves or ways $d'$, $d^2$, formed upon the under side of the cylinder A, and has an adjusting nut $d^3$, upon its upper end the spring B, itself gradually tapering in width from its base or larger end to its free or cushion supporting end this tapering form of spring greatly enhancing the tension of the same.

C, designates a receptacle for the reception of a rubber or other elastic cushion E, the cushion being secured in the receptacle by means of the inwardly turned ends or flanges $h$ $h$ $h$ $h$ of the receptacle C which is secured to the free end of the spring by means of a headed bolt $e$, and nut $f$, or other suitable fastening means, holes $f'$, $f^2$, being made in the end of the spring and bottom of the cushion receptacle respectively through which the bolt $e$, is passed, which secures the receptacle firmly to the end of the spring B, the under side of the receptacle being recessed at $g$, to receive the end of the said spring and prevent breaking of the braces through the medium of the cushion in the receptacle in passing over rough roads and prevent any displacement of the cushioned receptacle from contact of the buggy braces in manipulating the buggy top.

By my construction of device I am enabled to readily and conveniently adjust the spring with its accompanying receptacle in which the cushion is seated at any point desired upon the cylinder A, to adapt it to the varying widths of spindles to which the cylinder is applied which is of the first importance as it can be readily applied without its having to be made particularly for such spindles.

My invention is convenient in its application, durable, light, strong, simple in its construction and cheap to manufacture.

From the foregoing description taken in connection with the accompanying drawings the operation of my device will be obvious and further description of the same thereof is deemed unnecessary.

Having thus described my invention, what

I claim as new, and desire to secure by Letters Patent, is—

1. The combination with the cylinder A, having the groove $a$, and longitudinal slot $a'$, and grooves or ways $d'$, $d^2$, with the curvilinear spring and headed bolt and nut, substantially as described.

2. The combination with the cylinder A, having the groove $a$, and longitudinal slot $a'$, and grooves or ways $d'$, $d^2$, curvilinear spring B, and headed bolt and nut, of the receptacle C, and cushion E, secured to the free end of the spring B, substantially as and for the purposes set forth.

In testimony whereof I affix my signature in presence of two witnesses.

LEWIS C. POLLARD.

Witnesses:
W. T. REYNOLDS,
C. W. HUSSEY.